Patented Jan. 26, 1954

2,667,477

UNITED STATES PATENT OFFICE 2,667,477
DISAZO-DYESTUFFS

Hans Wilhelm Liechti, Riehen, Switzerland, assignor to Ciba Limited, Basel, Switzerland, a firm of Switzerland No Drawing. Application November 13, 1950, Serial No. 195,453

Claims priority, application Switzerland December 2, 1949

9 Claims. (Cl. 260—175)

This invention provides valuable new disazo-dyestuffs which correspond to the general formula $$R_1-A-B-NH-\overset{O}{\underset{\|}{C}}-HN-R_4-N=N-R_5$$

in which $R_1$ represents an aromatic radical of the benzene series containing a carboxyl group in ortho-position with respect to a hydroxyl group, one of the symbols A and B represents a radical of the formula $$-N=N-R_2-$$

in which $R_2$ represents an aromatic radical of the benzene series having the groups —N=N— and —NH— bound thereto in para-position, the other of the symbols A and B represents a radical of the formula —NH—CO—$R_3$—, in which $R_3$ represents an aromatic radical of the benzene series in which the carbon atoms, which contain the —NH—CO— group and one of the indicated nitrogen-containing substitutents, are separated from one another by at least 1 carbon atom, $R_4$ represents an aromatic radical of the benzene series to which the groups —NH— and —N=N— are bound in para-position and which contains a chlorine or bromine atom in ortho-position to the —N=N— group, and $R_5$ represents an aromatic radical of the benzene series containing a carboxyl group in ortho-position with respect to a hydroxyl group, and in which the entire dyestuff molecule contains only a single sulfonic acid group which is present in the radical $R_1$—A—B—NH— and no carboxyl groups other than those bound to $R_1$ and $R_5$.

The above dyestuffs are made in accordance with the invention by linking together by means of phosgene to form a urea derivative two amino-monoazo-dyestuffs of the following formulae (1)
$$R_1-A-B-N\diagdown\overset{H}{\diagup}_H$$

and (2)
$$\overset{H}{\diagdown}\underset{H}{\diagup}N-R_4-N=N-R_5$$

in which $R_1$, $R_4$, $R_5$, A and B have the meanings given in the preceding paragraph, and the two monoazo-dyestuff molecules contain (between them) only a single sulfonic acid group which is present in the dyestuff of the formula 1 and no carboxyl groups other than those bound to the radicals $R_1$ and $R_5$.

If the sulfonic acid group which is present in the amino-monoazo-dyestuff of the Formula 1 is not bound to $R_1$, it may be bound to $R_2$ provided that the radical —N=N—$R_2$— is bound directly to $R_1$.

The monoazo-dyestuffs corresponding to the above Formula 1 may either have the constitution (1a)
$$R_1-N=N-R_2-NH-OC-R_3-N\diagdown\overset{H}{\diagup}_H$$

or the constitution (1b)
$$R_1-NH-OC-R_3-N=N-R_2-N\diagdown\overset{H}{\diagup}_H$$

Monoazo-dyestuffs corresponding to the Formula 1a may be made, for example, by coupling a diazo compound of an amine of the formula $R_1$—$NH_2$, in which $R_1$ represents an aromatic radical of the benzene series which contains a sulfonic acid group and a carboxyl group in ortho-position with respect to a hydroxyl group, with an amine of the benzene series ($HR_2$—$NH_2$), condensing the resulting monoazo dyestuff with meta- or advantageously para-nitrobenzoyl chloride (ClOC—$R_3$—$NO_2$) and reducing the nitro group to an amine group. Alternatively, certain products corresponding to the Formula 1a may be made by coupling a diazo compound of an amine of the benzene series containing a sulfonic acid group and having the formula $H_2N$—$R_2$—$a$, in which the substituent ($a$) represents a substituent in para-position to the amino group and convertible into an amino group, with 1-hydroxybenzene-2-carboxylic acid or a substitution product ($R_1$—H) thereof capable of coupling to form a dyestuff of the formula $R_1$—N=N—$R_2$—$a$, then converting into an amino group the substituent so convertible, condensing the resulting monoazo dyestuff with meta- or para-nitrobenzoyl chloride, and finally reducing the nitro group in the resulting nitro-azodyestuff to an amino group. Instead of starting from an amine of the formula $H_2N$—$R_2$—$a$ it is also possible in certain cases to diazotize only one of the two amino groups in an amine of the formula $H_2N$—$R_2$—$NH_2$, whereby the formation of the amino-monoazo-dyestuff of the formula $R_1$—N=N—$R_2$—$NH_2$ is simplified by omitting the step of converting the substituent $a$ into an amino group. Such a compound is, for example, 1:4-diaminobenzene-2-sulfonic acid, of which the amino group in the 4-position alone can be diazotized by the action of one molecular proportion of nitrous acid. A number of amino-monoazo-dyestuffs of the above Formula 1a and the method of making them are known (see Patents Nos. 2,341,791 and 2,375,561).

Amino-monoazo-dyestuffs corresponding to the above Formula 1b can also be made by methods in themselves known, for example, by condensing an amine of the formula $R_1$—$NH_2$, in which $R_1$ has the meaning given above, with meta- or para-nitrobenzoyl chloride to form a compound of the formula

$R_1$—NH—OC—$R_3$—$NO_2$ reducing the nitro group in the resulting product to an amino group, diazotizing the resulting product of the formula

$R_1$—NH—OC—$R_3$—$NH_2$ and coupling it with an amine of the benzene series ($HR_2$—$NH_2$).

As starting materials for making the amino-monoazo-dyestuffs of the Formulae 1a and 1b by the methods described above, there come into consideration, for example, the following compounds:

As amines of the formula $R_1$—$NH_2$ containing a sulfonic acid group:

6-amino-1-hydroxybenzene-2-carboxylic acid-4-sulfonic acid,
4-amino-1-hydroxybenzene-2-carboxylic acid-5-sulfonic acid, and especially
4-amino-1-hydroxybenzene-2-carboxylic acid-6-sulfonic acid.

As coupling components of the formula $R_1$—H and free from sulfonic acid groups there may be mentioned:

5- or 6-methyl-1-hydroxybenzene - 2-carboxylic acid,
6-chloro - 1-hydroxybenzene - 2 - carboxylic acid and especially
1-hydroxybenzene-2-carboxylic acid.

As amines of the formula $HR_2$—$NH_2$ there may be mentioned:

Aminobenzene,
1-amino-2- or -3-methylbenzene,
1-amino-2:5-dimethylbenzene,
1-amino-2- or -3-methoxybenzene,
1-amino-2:5-dimethoxybenzene, and especially
1-amino-2-methoxy-5-methylbenzene.

As amines of the formula $H_2N$—$R_2$—$a$ there may be mentioned:

1-amino-4-nitrobenzene-2- or -3-sulfonic acid and
1-amino-4-acetylaminobenzene-2- or -3-sulfonic acid.

The reactions necessary for making the amino-monoazo dyestuffs can be carried out by methods in themselves known. Coupling with ortho-hydroxy-carboxylic acids of the benzene series of the formula $R_1$—H is advantageously conducted in an alkaline medium. Coupling with the amines of the formula $HR_2$—$NH_2$, on the other hand, is conducted in acid medium, for example, a medium rendered acid with acetic acid. Certain of these amines such, for example, as aminobenzene or 1-amino-3-methylbenzene are advantageously coupled in the form of their ω-methane sulfonic acids and then the ω-methane sulfonic acid group is split off, for example, by the action of heat in a dilute solution of an alkali hydroxide. Condensation with meta- or para-nitrobenzoyl chloride may be carried out, for example, by adding the latter acid chloride dissolved in acetone to an aqueous solution of the amine to be brought into reaction, and neutralizing the corresponding hydrochloric acid with an acid-binding agent such as sodium bicarbonate. The reduction of the nitro group to an amino group in the nitro-azo-dyestuff must be conducted under conditions such that the azo group is not attacked. This can be achieved by conducting the reaction with an alkali metal sulfide or ammonium sulfide.

The monoazo dyestuffs of the above Formula 2 also used as starting materials in the present process are free from sulfonic acid groups. They can be obtained by coupling a diazo compound of an amine of the formula $a$—$R_4$—$NH_2$ in which $R_4$ represents an aromatic radical of the benzene series containing a bromine or preferably a chlorine atom in ortho-position with respect to the amino group, and $a$ represents a substituent convertible into an amino group, with 1-hydroxybenzene-2-carboxylic acid or a substitution product (H—$R_5$) thereof capable of coupling, and converting in the resulting monoazo dyestuff into an amino group the substituent so convertible.

As examples of amines of the formula $a$—$R_4$—$NH_2$ there may be mentioned: 1-amino-2-bromo-4-nitrobenzene, but preferably 1 amino-2-chloro-4-nitrobenzene or 1-amino-2-chloro-4-acetylaminobenzene.

As ortho-hydroxybenzene carboxylic acids of the formula H—$R_5$ there also come into consideration in this connection the other compounds designated above as having the formula $R_1$—H. For preparing amino-monoazo dyestuffs of the Formula 2 the information given above for preparing dyestuffs of the formula

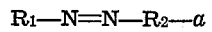
$R_1$—N=N—$R_2$—$a$ is also applicable.

The linkage together of the amino-monoazo dyestuffs of the Formulae 1 and 2 to form asymmetrical urea derivatives by means of phosgene is advantageously carried out in an aqueous weakly alkaline medium, for example, one rendered weakly alkaline with an alkali carbonate, at a slightly raised temperature, and if desired with the addition of a wetting agent or dispersing agent.

The dyestuffs of this invention are principally suitable for dyeing or printing materials of cellulose such as cotton, linen and artificial silk or staple fibers of regenerated cellulose. Especially valuable dyeings, which are distinguished by a very good fastness to light, are obtained by treating the dyestuffs with an agent yielding metal on the fiber or partially on the fiber and partially in the dyebath. It is of advantage to use, for example, the process of Patent No. 2,148,659 in which first the dyeing, then the treatment with an agent yielding metal are carried out in the same bath. As agents yielding metal there come into consideration more especially agents yielding copper, and particularly those which are stable towards alkaline solutions, such as complex copper tartrates.

Very valuable dyeings are obtained by the process in which dyeings or prints produced with the metal-free dyestuffs are after-treated with aqueous solutions containing basic condensation products of formaldehyde with compounds which contain at least once the grouping

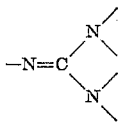

or products, such as cyanamide, which can easily be converted into such compounds, and also contain water-soluble copper compounds. Such a process is described for example, in British Patent No. 619,969.

The following examples illustrate the invention, the parts and percentages being by weight:

Example 1

17.25 parts of 1-amino-2-chloro-4-nitro-benzene are diazotized in known manner and coupled in a weakly alkaline solution with 13.8 parts of 1-hydroxy-benzene-2-carboxylic acid. Then a solution of 42 parts of crystalline sodium sulfide in 75 parts of water is run in, and the whole is stirred at 60–70° C. until the reduction of the nitro group is finished.

29.1 parts of the precipitated aminoazodyestuff are dissolved with 50 parts of 4'-(4''-amino)-benzoylamino-2'-methyl-5'-methoxy-4-hydroxy-1:1'-azobenzene-3-sulfonic acid-5-carboxylic acid in 3000 parts of water with the addition of sufficient sodium carbonate to produce a distinctly alkaline reaction, and the whole is treated with phosgene at 35–45° C. until amino groups can no longer be detected. The dyestuff is completely precipitated, separated by filtration and dried. It is a brown powder which dissolves in water with an orange coloration and in concentrated sulfuric acid with a blood-red coloration, and dyes cotton and regenerated cellulose by the single bath or 2-bath after-coppering process yellow tints having very good properties of wet fastness and fastness to light. Instead of 1-hydroxybenzene-2-carboxylic acid there may be used as coupling component 5- or 6-methyl-1-hydroxybenzene-2-carboxylic acid or 6-chloro-1-hydroxybenzene-2-carboxylic acid.

Instead of 4'-(4''-amino)-benzoylamino-2'-methyl-5'-methoxy-4-hydroxy-1:1'-azobenzene-3-sulfonic acid-5-carboxylic acid there may be used for preparing the asymmetrical urea derivative 4'-(3''-amino)-benzoyl-amino-2'-methyl-5'-methoxy-4-hydroxy-1:1'-azobenzene-3-sulfonic acid-5-carboxylic acid.

The 4'-(4''- or 3''-amino)-benzoylamino-2'-methyl-5'-methoxy-4-hydroxy-1:1'-azobenzene-3-sulfonic acid-5-carboxylic acid used as starting material in this example can be obtained, for example, by coupling diazotized 4-amino-1-hydroxybenzene-2-carboxylic acid-6-sulfonic acid with 1-amino-2-methoxy-5-methylbenzene, condensing the resulting product with para- or meta-nitrobenzoyl chloride, and finally reducing the nitro group to an amino group. Valuable disazo dyestuffs which dye cellulose fibers also in fast yellow tints by known coppering processes, can be prepared by using, instead of the two amino-monoazo dyestuffs mentioned above an amino-monoazo dyestuff obtainable in an analogous manner with the aid of phosgene, and in the manufacture of which there are used, as coupling components, instead of 1-amino-2-methoxy-5-methylbenzene, one of the following compounds:

1-amino-2:5-dimethylbenzene, 1-amino-2:5-dimethoxybenzene,
1-amino-2- or -3-methoxybenzene or 1-amino-3-methylbenzene.

Example 2

29.1 parts of 4-amino-2-chloro-4'-hydroxy-1:1'-azobenzene-3'-carboxylic acid obtained as described in the first paragraph of Example 1 and 45.6 parts of the dyestuff of the formula

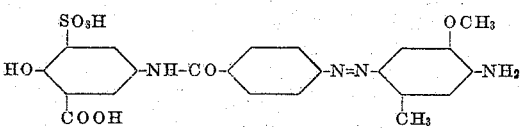

are converted by means of phosgene in the usual manner into the asymmetrical urea derivative. When separated and dried the dyestuff is a brown powder which dissolves in water with an orange coloration and in concentrated sulfuric acid with a red coloration, and dyes cotton and regenerated cellulose by the single bath or 2-bath after-coppering process brownish yellow tints having very good properties of wet fastness and fastness to light.

Instead of 4-amino-2-chloro-4'-hydroxy-1:1'-azobenzene-3'-carboxylic acid there may be used 4-amino-2-chloro-3'-methyl-4'-hydroxy-1:1'-azobenzene-5'-carboxylic acid.

Instead of the dyestuff of the above formula there may be used the dyestuff of the formula

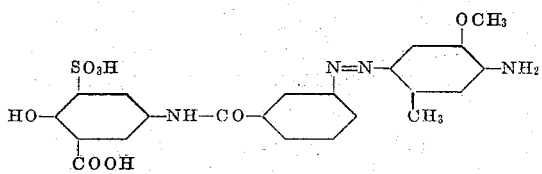

for producing the asymmetrical urea derivative.

The amino-disazo-dyestuffs corresponding to the two formulae given in this example can be obtained by condensing 4-amino-1-hydroxybenzene-2-carboxylic acid-6-sulfonic acid with meta- or para-nitrobenzoyl chloride, reducing the nitro group to an amino group, diazotizing the resulting amine in the usual manner, and coupling the latter with 1-amino-2-methoxy-5-methylbenzene in a weakly acid solution.

Dyestuffs having practically the same properties are obtained by using as a coupling component 1-amino-2:5-dimethylbenzene, 1-amino-2:5-dimethoxybenzene, 1-amino-2- or -3-methoxybenzene or 1-amino-3-methylbenzene, instead of 1-amino-2-methoxy-5-methylbenzene.

Example 3

29.1 parts of 4-amino-2-chloro-4'-hydroxy-1:1'-azobenzene-3'-carboxylic acid, obtained as described in Example 1 and 45.6 parts of 4'-(4''-amino)-benzoylamino-6'-sulfonic acid-4-hydroxy-1:1'-azobenzene-5-carboxylic acid are converted in the usual manner with phosgene into the asymmetrical urea derivative.

The dyestuff is completely precipitated, and separated by filtration and dried. It is a brown powder which dissolves in water with an orange coloration and in concentrated sulfuric acid with a red coloration, and dyes cotton and regenerated cellulose by the single-bath or 2-bath after-coppering process yellow tints having very good properties of wet fastness and fastness to light.

Instead of 4-amino-2-chloro-4'-hydroxy-1:1'-azobenzene-3'-carboxylic acid, there may be used 4-amino-2-chloro-3'-methyl-4'-hydroxy-1:1'-azobenzene-5'-carboxylic acid.

Instead of 4'-(4''-amino)-benzoylamino-6'-sulfonic acid-4-hydroxy-1:1'-azobenzene-5-carboxylic acid, 4'-(3''-amino)-benzoylamino-6'-sulfonic acid-4-hydroxy-1:1'-azobenzene-5-carboxylic acid may be used for making the asymmetrical urea derivative. Furthermore the position of the sulfonic acid group in the benzene nucleus containing it can be changed so that the asymmetrical urea derivative then contains one of the components 4'-(3"-or 4"-amino)-benzoylamino-5'-sulfonic acid-4-hydroxy-1:1'-azobenzene-5-carboxylic acid.

The aminoazo dyestuff 4'-(3"- or 4"-amino)-benzoylamino - 6 - sulfonic acid-4-hydroxy-1:1'-azobenzene-5-carboxylic acid used in this example can be prepared by coupling diazotized 1-amino-4-nitrobenzene-2-sulfonic acid with 1-hydroxybenzene-2-carboxylic acid in alkaline solution, reducing the nitro group to an amino group, condensing the resulting product with meta- or para-nitrobenzoyl chloride, and finally reducing the nitro-group to an amino group.

The aminoazo-dyestuff 4'-(3"- or 4"-amino)-benzoylamino-5'-sulfonic acid-4-hydroxy - 1:1'-azobenzene-5-carboxylic acid is obtained by coupling diazotized 1:4-diaminobenzene-2-sulfonic acid with 1-hydroxybenzene-2-carboxylic acid in alkaline solution, condensing the unchanged 1-amino group with meta- or para-nitrobenzoyl chloride and reducing the nitro group to an amino group.

Instead of 1-hydroxybenzene-2-carboxylic acid there may be used as coupling components 5- or 6-methyl-1-hydroxybenzene-2-carboxylic acid or 6-chloro-1-hydroxybenzene-2-carboxylic acid.

Example 4

21.7 parts of 1-amino-2-bromo-4-nitrobenzene are diazotized in known manner and coupled with 13.8 parts of 1-hydroxybenzene-2-carboxylic acid. A solution of 42 parts of crystalline sodium sulfide in 75 parts of water is then run in and the whole is stirred at 60–70° C. until the reduction of the nitro group has finished.

33.6 parts of the isolated aminoazo-dyestuff are dissolved in 3000 parts of water together with 50 parts of 4'-(4"-amino)-benzoylamino-2'-methyl - 5' - methoxy-4-hydroxy-1:1'-azobenzene-3-sulfonic acid-5-carboxylic acid with the addition of sufficient sodium carbonate to produce a distinctly alkaline reaction, and the whole is treated at 35–45° C. with phosgene until amino groups can no longer be detected. The dyestuff is completely precipitated and separated by filtration and dried. It is a brown powder which dissolves in water with an orange coloration and in concentrated sulfuric acid with a red coloration, and dyes cotton and also regenerated cellulose by the single bath or 2-bath after-coppering process yellow tints having very good properties of wet fastness and fastness to light.

Instead of 1-hydroxybenzene-2-carboxylic acid there may be used as the coupling component 5- or 6-methyl-1-hydroxybenzene-2-carboxylic acid.

Instead of 4'-(4"-amino)-benzoylamino-2'-methyl - 5' - methoxy - 4 -hydroxy - 1:1' - azobenzene-3-sulfonic acid-5-carboxylic acid, 4'-(3" - amino) - benzoylamino - 2' - methyl - 5' - methoxy - 4 - hydroxy - 1:1' - azobenzene - 3 - sulfonic acid-5-carboxylic acid may be used for making the asymmetrical urea derivative.

Example 5

100 parts of cotton are entered at 50° C. into a dyebath containing in 4000 parts of water, 2 parts of anhydrous sodium carbonate and 0.8 part of the dyestuff obtainable as described in the first and second paragraphs of Example 1. The temperature is slowly raised to the boil, 30 parts of crystalline sodium sulfate are added, and dyeing is carried on for ¾ hour at about 95° C. The whole is then allowed to cool to about 70° C., 1 part of complex sodium-copper tartrate is added, the cotton is then worked in the bath for ½ hour at about 80° C., and then cooled with cold water. A yellow dyeing is obtained having very good properties of fastness to washing and light.

What is claimed is—

1. A disazo-dyestuff corresponding to the formula

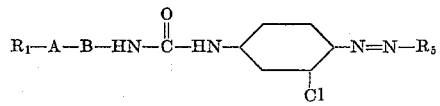

in which $R_1$ represents a benzene radical containing a hydroxyl group in para-position to A and a carboxyl group in ortho-position with respect to said hydroxyl group, one of the symbols A and B represents a radical of the formula —N=N—$R_2$, wherein $R_2$ stands for a benzene radical having the groups —N=N— and —NH— bound thereto in para-position, the other of the symbols A and B represents a radical of the formula —NH—CO—$R_3$—, wherein $R_3$ stands for a benzene radical in which the carbon atoms, which contain the —NH—CO— group and one of the indicated nitrogen-containing substituents, are separated from one another by at least one carbon atom, and $R_5$ represents a benzene radical containing a hydroxyl group in para-position to the adjacent —N=N— group and a carboxyl group in ortho-position with respect to the last-mentioned hydroxyl group, and in which the entire dyestuff molecule contains but the two carboxylic acid groups bound to $R_1$ and $R_5$ and contains a single sulfonic acid group which is present in the radical $R_1$—A—B—NH—.

2. A disazo-dystuff corresponding to the formula

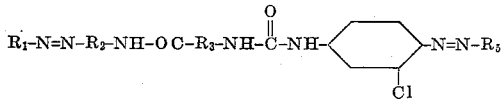

in which $R_1$ represents a benzene radical containing a hydroxyl group in para-position to the adjacent —N=N— group and a carboxyl group in ortho-position with respect to said hydroxyl group, $R_2$ represents a benzene radical having the groups —N=N— and —NH— bound thereto in para-position, $R_3$ represents a benzene radical, in which the carbon atoms, which contain the two —NH—CO— groups, are separated from one another by at least one carbon atom, and $R_5$ represents a benzene radical containing a hydroxyl group in para-position to the adjacent —N=N— group and a carboxyl group in ortho-position with respect to the last mentioned hydroxyl group, and in which the entire dyestuff molecule contains but the two carboxylic acid groups bound to $R_1$ and $R_5$ and contains a single sulfonic acid group which is present in the radical $R_1$—N=N—$R_2$—.

3. A disazo-dyestuff correspondng to the formula

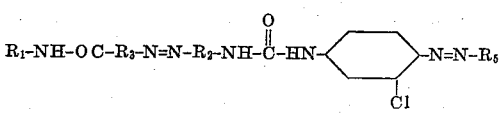

in which $R_1$ represents a benzene radical containing a hydroxyl group in para-position to the adjacent —NH— group and a carboxyl group in ortho-position with respect to said hydroxyl group, R₂ represents a benzene radical having the groups —N=N— and —NH— bound thereto in para-position, R₃ represents a benzene radical in which the carbon atoms which contain the —NH—OC— group and the —N=N— group, are separated from one another by at least one carbon atom and R₅ represents a benzene radical containing a hydroxyl group in para-position to the adjacent —N=N— group and a carboxyl group in ortho-position with respect to the last mentioned hydroxyl group, and in which the entire dyesuff molecule contains but the two carboxylic acid groups bound to R₁ and R₅ and contains a single sulfonic acid group which is bound to R₁.

4. A disazo-dyestuff corresponding to the formula

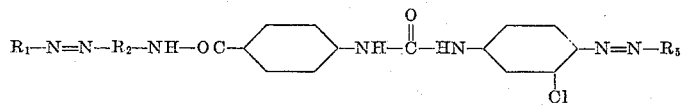

in which R₁ and R₅ each represents a benzene radical containing a hydroxyl group in para-

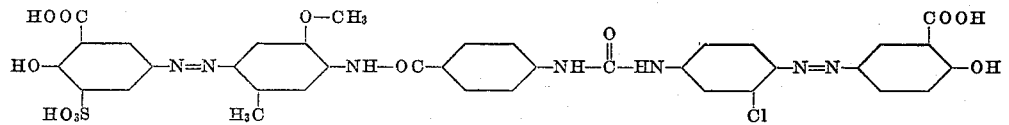

position to the adjacent —N=N— group and a carboxyl group in ortho-position with respect to said hydroxyl group, R₂ represents a benzene radical having the groups —N=N— and —NH— bound thereto in para-position, and in which the entire dyestuff molecule contains but the two carboxylic acid groups bound to R₁ and R₅ and contains a single sulfonic acid group which is present in the radical R₁—N=N—R₂.

5. A disazo-dyestuff corresponding to the formula

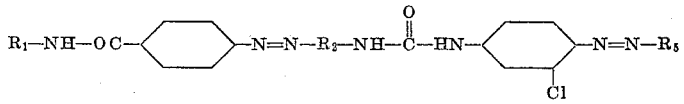

in which R₁ represents a benzene radical containing a hydroxyl group in para-position to the adjacent —NH— group and a carboxyl group in ortho-position with respect to said hydroxyl group, R₂ represents a benzene radical having the groups —N=N— and —NH— bound thereto in para-position, R₅ represents a benzene radical containing a hydroxyl group in para-position to adjacent —N=N— group and a carboxyl group in ortho-position to the last-mentioned hydroxyl groups, and in which the entire dyestuff molecule contains but the two carboxylic acid groups bound to R₁ and R₅ and contains a single sulfonic acid group which is bound to R₁.

6. The disazo-dyestuff corresponding to the formula

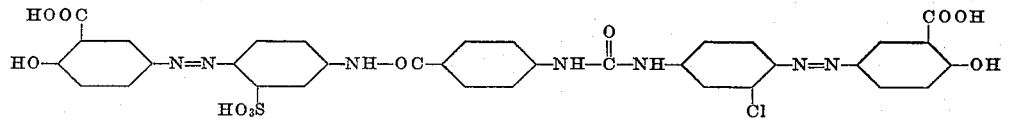

7. The disazo-dyestuff corresponding to the formula

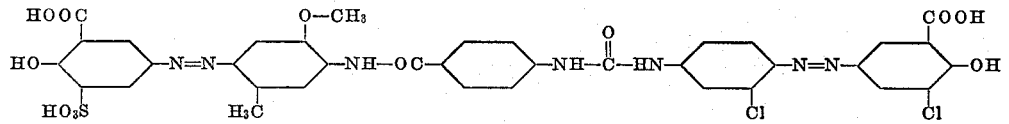

8. The disazo-dyestuff corresponding to the formula

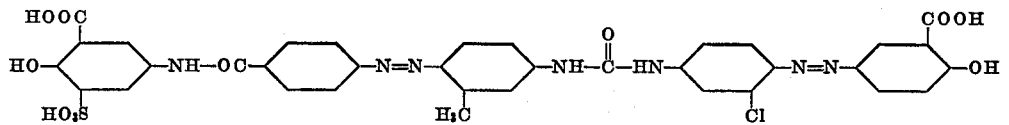

9. The disazo-dyestuff corresponding to the formula

HANS WILHELM LIECHTI.

References Cited in the file of this patent

UNITED STATES PATENTS

| Number | Name | Date |
| --- | --- | --- |
| 2,341,791 | Kaiser | Feb. 15, 1941 |
| 2,375,561 | Kaiser | May 8, 1945 |

OTHER REFERENCES

Reynolds, "Constitution of Azo Dyes," American Dyestuff Reporter, vol. 32, October 25, 1943, pages 455 and 456.